United States Patent
Przybyla et al.

(10) Patent No.: US 7,273,282 B2
(45) Date of Patent: Sep. 25, 2007

(54) PROJECTION SYSTEM WITH OPTICAL FILTER

(75) Inventors: Jim Przybyla, Philomath, OR (US); Art Piehl, Corvallis, OR (US); Winthrop D. Childers, San Diego, CA (US); Eric Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 10/971,257

(22) Filed: Oct. 23, 2004

(65) Prior Publication Data

US 2006/0087624 A1    Apr. 27, 2006

(51) Int. Cl.
G03B 21/14    (2006.01)
(52) U.S. Cl. .................. 353/31; 353/84; 348/743
(58) Field of Classification Search ................ 359/589, 359/590, 889–892; 353/31, 20, 84; 349/5–10; 362/293; 356/416, 418; 348/742, 743, 771
See application file for complete search history.

(56) References Cited

U.S. PATENT DOCUMENTS

| | | | |
|---|---|---|---|
| 6,147,720 A * | 11/2000 | Guerinot et al. ............ 348/744 |
| 6,644,812 B2 * | 11/2003 | Kodama et al. .............. 353/31 |
| 6,678,078 B1 * | 1/2004 | Popovich et al. ............. 359/15 |
| 6,726,333 B2 * | 4/2004 | Huibers et al. ............... 353/84 |
| 6,733,139 B2 * | 5/2004 | Childers et al. .............. 353/94 |
| 6,956,702 B2 * | 10/2005 | Pate .......................... 359/634 |
| 7,044,608 B2 * | 5/2006 | Okuyama et al. ............ 353/84 |
| 7,066,603 B2 * | 6/2006 | Akiya ......................... 353/81 |
| 2003/0086066 A1 * | 5/2003 | Kato .......................... 353/20 |
| 2003/0133077 A1 * | 7/2003 | Takezawa et al. ........... 353/20 |
| 2004/0135975 A1 * | 7/2004 | Wang ......................... 353/84 |
| 2004/0212895 A1 * | 10/2004 | Pate .......................... 359/634 |
| 2004/0246448 A1 * | 12/2004 | Ogawa et al. ............... 353/84 |
| 2005/0083293 A1 * | 4/2005 | Dixon ........................ 345/102 |
| 2006/0012734 A1 * | 1/2006 | Kuan et al. ................. 349/108 |
| 2006/0033888 A1 * | 2/2006 | Deppe et al. ................ 353/85 |
| 2006/0274285 A1 * | 12/2006 | Pao ............................ 353/84 |

* cited by examiner

Primary Examiner—William C. Dowling

(57) ABSTRACT

A projection system is disclosed that includes a light source, a spatial light modulator, and an optical filter. The light source is configured to generate a light beam having a spectral distribution spanning a set of primary colors. The spatial light modulator has an array of pixel elements. Each pixel element is configured to receive a portion of the light beam and to output a modulated light beam with a spectral peak defining one of the set of primary colors. The optical filter is configured to narrow the spectral peak.

26 Claims, 5 Drawing Sheets

PROJECTION SYSTEM WITH OPTICAL FILTER

BACKGROUND OF THE INVENTION

Projection systems are generally devices that integrate light sources, optics systems, electronics, and spatial light modulators for projecting data such as images, video, documents, and spreadsheets from computers or video devices onto walls or front or rear screens, for large-image viewing. They are especially popular among business users who give presentations as part of their job responsibilities. Newer projectors can weigh as little as a few pounds, making them well suited for business travelers. Projectors are also finding their way into peoples' homes for high-definition-television (HDTV) and other home entertainment applications.

Ever-present concerns with projection systems include achieving high color saturation and high color accuracy. High color saturation allows for vibrant and rich colors to be projected. High color accuracy ensures that the colors being projected are true and substantially identical to the colors meant to be projected. However, frequently color saturation and color accuracy are opposing goals. Achieving high color saturation, in other words, can mean that color accuracy is sacrificed, and vice-versa.

One solution is to increase the number of spatial light modulators within a projection system, so that there are separate spatial light modulators for each sub-pixel of each pixel of image data to be projected. For instance, there may be a spatial light modulator for the red sub-pixel of each pixel of the image data, for the green sub-pixel of each pixel, and for the blue sub-pixel. However, introducing a larger number of spatial light modulators into a projection system increases its cost greatly, and can increase complexity of the projection system as well.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise-not to be made.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Figure 1:
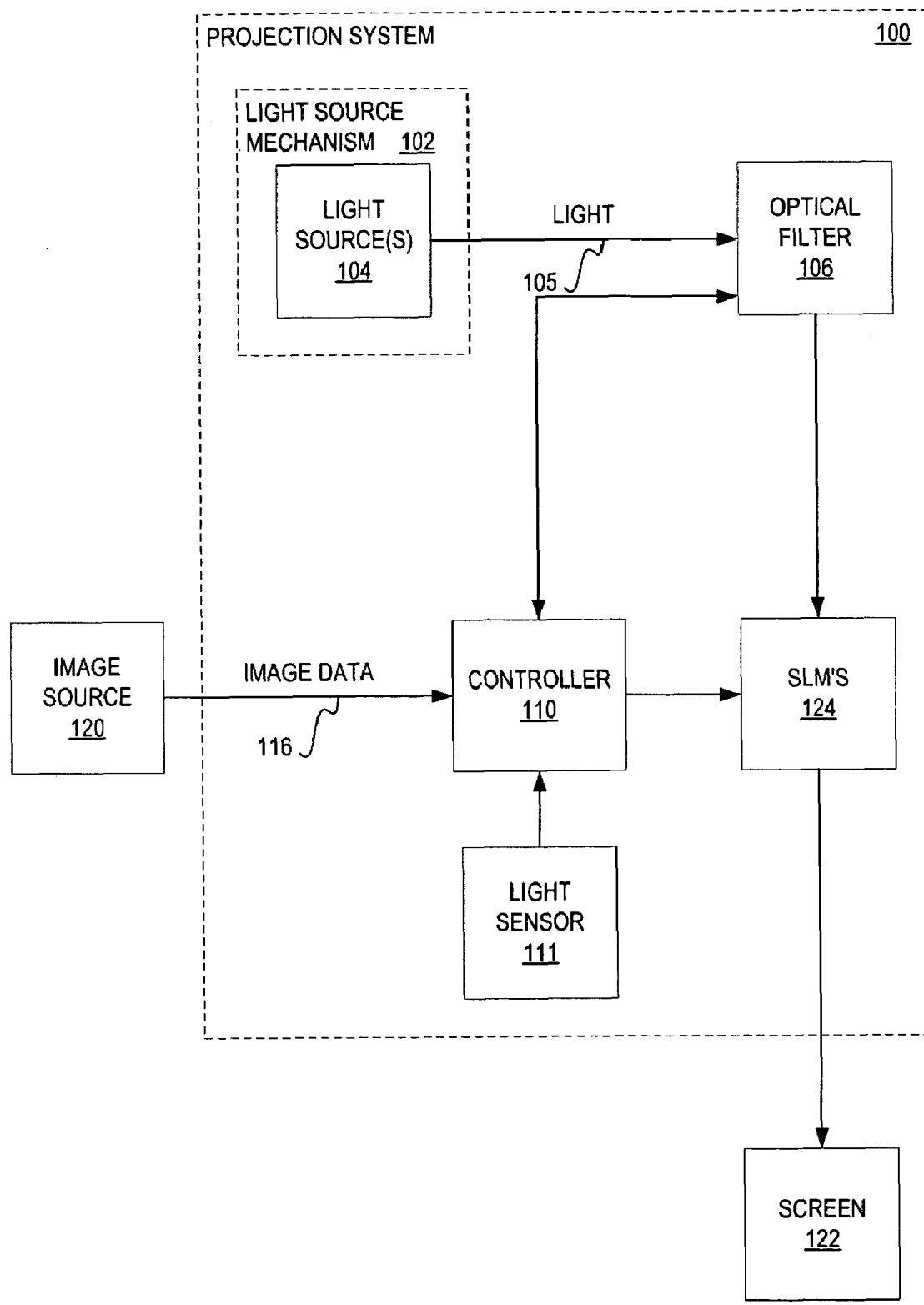
FIG. 1 is a diagram of a projection system including an optical filter, according to an embodiment of the invention.

FIG. 1 shows a block diagram of a projection system 100 according to an embodiment of the invention. The system 100 may be implemented as a projector. As can be appreciated by those of ordinary skill within the art, the system 100 includes components specific to a particular embodiment of the invention, but may include other components in addition to or in lieu of the components depicted in FIG. 1. The projection system 100 includes a-light source mechanism 102 that includes light source(s) 104, an optical filter 106, and color spatial light modulators (SLM's) 124. The SLM's 124 include an array of pixel elements that are each configured to receive incoming light and to output light having a spectral peak defining a primary color. The system 100 also includes a controller 110, and is operatively or otherwise coupled to an image source 120 to receive image data 116, as well as a screen 122. The controller 110 is also operatively or otherwise coupled to an ambient light sensor 111.

The light source(s) 104 of the light source mechanism. 102 output light 105, such as white light. Each of the light source(s) 104 may be an ultra high pressure (UHP) mercury vapor arc lamp, a xenon arc lamp, or another type of light source. For instance, the light source(s) may be other types of light bulbs, as well as other types of light sources such as light-emitting diodes (LED's), and so on. The light output by the light source(s) 104 is for ultimate modulation or projection by the SLM's 124. The light output by the light source(s) 104 has a spectral distribution spanning a set of primary colors to be generated by projection system 100. The optical filter 106 is situated in the optical path between the light sources 104 and the SLM's 124. As depicted in FIG. 1, the filter 106 is situated between the light sources 104 and the SLM's 124, However, in another embodiment, the filter 106 may be situated after the SLM's. 124, such that the SLM's 124 are situated between the light sources 104 and the filter 106. The optical filter 106 is configured to refine or better define the set of primary colors to be generated by projection system 100, as is described-later in the detailed description.

The controller 110 may be implemented in hardware, software, or a combination of hardware and software. The controller 110 receives image data 116 from an image source 120. The image source 120 may be a computing device, such as a computer, or another type of electronic and/or video device. The controller 110 controls the SLM's 124 in accordance with a current frame of the image data 116. The image data 116 defines an array of pixels, and the SLM's 124 receive control signals from controller 110 that allow the pixel elements of the SLM's 124 to define an image pursuant to the image data. In one embodiment, the controller 110 is able to selectively situate the optical filter 106 within the optical path from the light sources 104 to the SLM's 124, such as based on a user-set parameter, or based on ambient light conditions in which the projection system 100 is operating, as detected by the ambient light sensor 111. That is, the controller 110 is able to selectively activate the optical filter 106.

When the optical filter 106 is activated, primary colors generated within projection system 100 are better defined. That is, the spectral peaks that define the primary colors are narrower and hence better defined. That the spectral peaks are narrower means that the slopes leading up to the spectral peaks and down from the spectral peaks are made more steep. That is, the slopes of the spectral peaks are greater than if the optical filter 106 were not employed. Employment of the optical filter 106 therefore increases a color space or range of colors that can be generated by projector system 100, but may decrease brightness of the resultingly projected image since this is accomplished by removal of light from an optical path. When the optical filter 106 is not activated, the spectral peaks that define the color primaries are broader and less defined. Thus, when optical filter 106 is not employed, the color gamut or portion of a color space that can be generated by system 100 is reduced but the overall potential brightness is increased.

The optical filter 106 that is used may be a comb filter, a multiple narrow-band pass filter, a multiple notch filter, or another type of optical filter. For example, a multiple narrow-band pass filter has multiple narrow bands that are allowed to pass. These bands correspond to the spectral peaks that are to be better defined, such that the multiple narrow-band pass filter substantially causes just the frequencies corresponding to the spectral peaks to pass, narrowing the spectral peaks by increasing their slopes. Thus, the filter is a narrow-band pass filter in that it substantially allows just the frequencies corresponding to the spectral peaks to pass. The filter is a multiple narrow-band pass filter in that there are multiple bands, or frequencies, that are allowed to pass. A multiple narrow-band pass filter may be constructed in one embodiment of the invention by using a number of single-band pass filters that are placed in series with one another.

As another example, a multiple notch filter has multiple notches corresponding to frequencies that are not to be passed. For instance, if the three desired spectral peaks are red, green, and blue, then the multiple notch filter may notch out, or remove, frequencies corresponding to yellow, which are present between the red and green frequencies, and frequencies corresponding to cyan, which are present between the green and blue frequencies. The remaining frequencies corresponding to the spectral peaks of red, green, and blue are hence better defined in that they are narrower and have greater slopes, because the cyan and yellow frequencies that act to blend or blur the spectral peaks of red, green, and blue have been substantially removed. A multiple notch filter may be constructed in one embodiment of the invention by using a number of single-notch filters that are placed in series with one another. By definition, a comb filter may be considered as a multiple notch filter that may not require multiple single-notch filters placed in series with one another.

The user may set the parameter as to whether the optical filter 106 is activated depending on whether brightness or color gamut is to be maximized, by controlling a user interface of the projection system 100 or a computing or video device to which the system 100 is communicatively coupled. Furthermore, the controller 110 may be able to detect ambient light conditions via the ambient light sensor 111, and activate the optical filter 106 in the optical path from the light sources 104 to the SLM's 124 when ambient light conditions are relatively dark, and brightness of the output of projection system 100 is not critical. When ambient light conditions are relatively bright, the controller 110 may deactivate the optical filter 106, to increase brightness of the resultingly projected image. Furthermore, in one embodiment, the optical filter 106 may be selectively activated during each frame of the image data 116, as is described later in the detailed description. That is, the optical filter 106 may be selectively variable, in that its influence may vary, such as with time.

The SLM's 124 modulate the light output by the light sources 104 in accordance with the image data 116 as controlled by the controller 110. The image data 116 may be a still image or a moving image, for instance. This light is projected externally or outward from the projection system 100, where it is displayed on the screen 122, or another physical object, such as a wall, and so on. The screen 122 may be a front screen or a rear screen, such that the projection system 100 may be a front-projection system or a rear-projection system, as can be appreciated by those of ordinary skill within the art. The user of the projection system 100, and other individuals able to see the screen 122, are then able to view the image data 116.

The SLM's 124 are operable to receive light having a light spectrum that is relatively broad spectrally, such that the spectral distribution they receive spans the range of primary colors to be generated within projection system 100. Such light may be white light for instance. The SLM's 124 are on a pixel-by-pixel basis each able to output substantially no light—i.e., black—or a spectral peak defining one of a set of primary colors, such as red, green, and blue, or cyan and yellow, such that they can be referred to as color light modulators. The SLM's 124 receive a beam of light from light source 104. Each of the SLM's 124 includes an array of pixels that are positioned to receive a portion of the beam of light and to then output a modulated light beam having a spectral peak that defines one of the set of primary colors. The set of primary colors can include red, green, and blue, for example. Alternative sets of primary colors can include other colors, such as some or all of orange, yellow, cyan, magenta, and violet, for example.

The SLM's 124 may include multiple kinds of SLM's, which may be reflective, transmissive, or interference-type SLM's. Reflective SLM's include digital micromirror devices (DMD's), and modulate and reflect light to project the light through the projection optics mechanism 118 onto the screen 122. Transmissive SLM's modulate and transmit light therethrough to project the light through the mechanism 118 onto the screen 122. Interference-type SLM's rely on principles of optical interference to modulate light to project the light through the mechanism 118 onto the screen 122.

In one embodiment, the interference-type SLM's may be those described and disclosed in the copending patent application entitled "Optical interference pixel display with charge control," filed on Apr. 30, 2003, and assigned application Ser. No. 10/428,261. In this embodiment, at least one of the SLM's 124 is an interference based modulator that includes an array of optical cavities that each defines the pixel elements for the SLM. Each optical cavity has a gap dimension defined by control signals from the controller 110. The SLM receives a beam of light from light source 104 or optical filter 106. A portion of the beam of light is received by each optical cavity. As determined by the control signals, each optical cavity gap dimension defines a black state in which the portion of the beam is nearly completely absorbed by the optical cavity, or a primary color state in which the optical cavity outputs a modulated beam of light having a spectral peak defining a primary color.

The SLM's 124 are configured to receive a portion of the light beam generated from the light source 104, such as through the optical filter 106, and in response output a modulated light beam that has a spectral defining, or selecting, a single one of a set of primary colors within the light beam, as is described in more-detail later in the detailed description. Where such SLM's 124 are interference based modulators, this functionality of the SLM's 124 is inherently performed by them. However, reflective, transmissive, and other types of modulators may not be able to inherently perform this functionality. Therefore, for these types of modulators to be able to select a single color, an additional filter or coating may be added to the SLM's 124. Such filter or coating is not to be confused with the optical filter 106, however.

Figure 2:
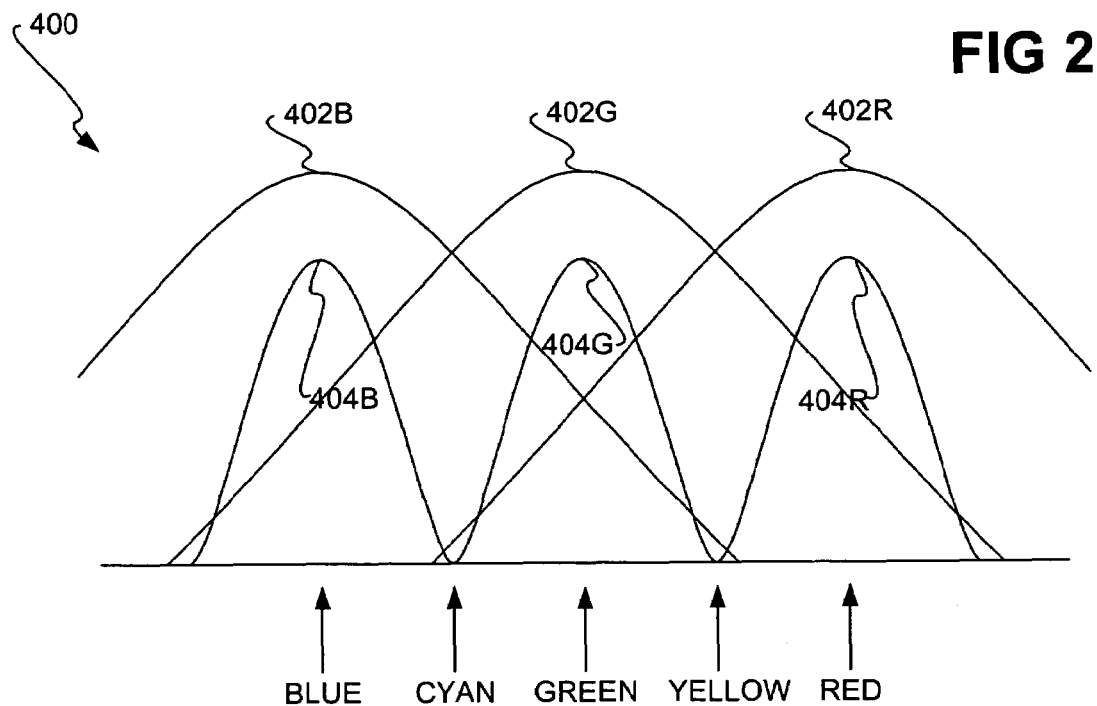
FIG. 2 is a graph depicting a frequency (spectral) response with lesser color peak definition when an optical filter is not used, and a frequency (spectral) response with greater color peak definition when the optical filter is employed, such that the color peaks are narrower when the optical filter is used, according to an embodiment of the invention.

FIG. 2 shows a graph 400 that depicts how color peak separation is achieved, and thus how color gamut is maximized, when using the optical filter 106, according to an embodiment of the invention. As can be appreciated by those of ordinary skill within the art, the graph 400 is an exaggerated depiction of frequency responses, to aid in illustrative clarity. When the optical filter 106 is not used, the blue frequency response 402B, the green frequency response 402G, and the red frequency response 402R have peaks that are not well defined, and that tend to blend into one another. This is because of the cyan light between the blue light and the green light blurring the spectral peaks of the blue and green light, and similarly because of the yellow light between the green light and the red light blurring the spectral peaks of the green and red light. By comparison, when the optical filter 106 is used, the blue frequency response 404B, the green frequency response 404G, and the red frequency response 404R have peaks that are better defined and more separated, which maximizes color gamut. This is because the optical filter 106 is tuned to remove yellow and cyan light, and/or allow red, green, and blue light to pass. The frequency responses 404B, 404G, and 404R, in other words, have slopes that are greater than the responses 402B, 402G, and 402R.

It is noted that the graph 400 of FIG. 2 depicts one embodiment of the invention, and the optical filter 106 may remove other color light, depending on the primary colors for which their spectral peaks are to be accentuated. For instance, cyan and yellow may be the primary colors in another embodiment of the invention, such that the spectral peaks of cyan and yellow are to be accentuated. In this embodiment, the red, green, and blue light may be removed by the optical filter 106, to accentuate and better define the spectral peaks of the cyan and yellow light.

Figure 3:
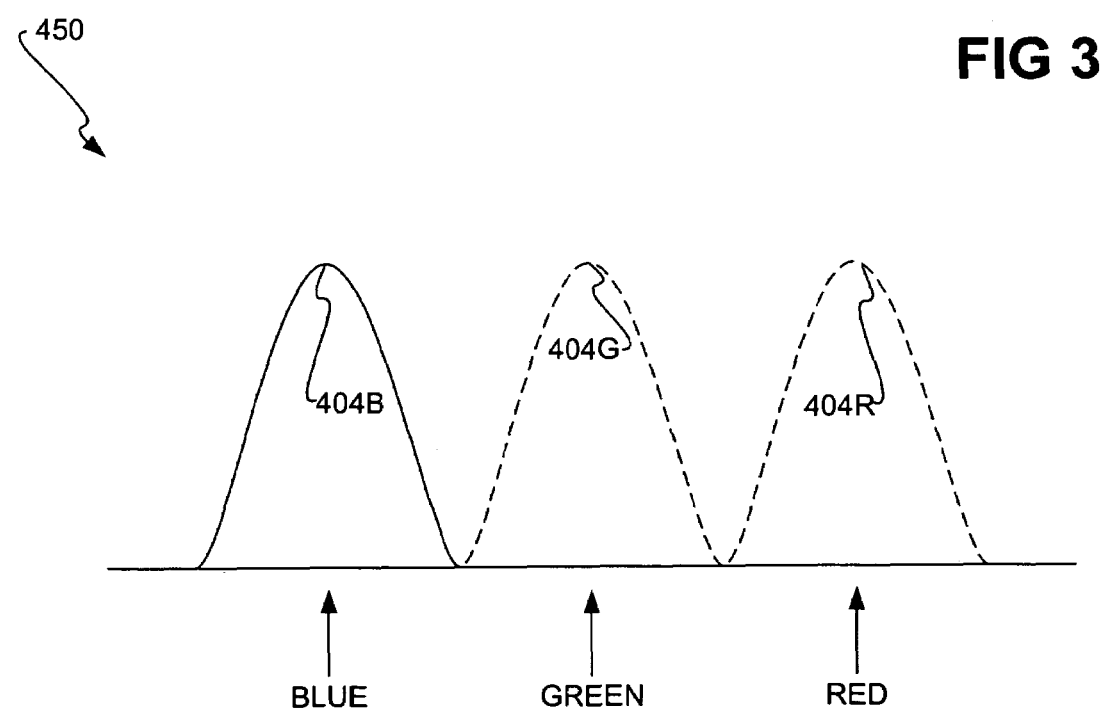
FIG. 3 is a graph depicting a frequency (spectral) response of light after being affected by an optical filter and before being affected by a spatial light modulator (SLM), and a frequency (spectral) response of the light after being affected by both the optical filter and the SLM, according to an embodiment of the invention.

FIG. 3 shows a graph 450 that depicts how the pixel element for one of the SLM's 124 is able to affect the frequency response of the light after the optical filter 106 has been used to affect the light, according to an embodiment of the invention. That is, the SLM for which the graph 450 is depicted in 450 is with respect to a single pixel element of the SLM, and how that single pixel element is able to affect light. Other pixel elements of the SLM, and other pixel elements of other of the SLM's 124, are able to similarly and independently affect light. As can be appreciated by those of ordinary skill within the art, the graph 450 is an exaggerated depiction of frequency responses, to aid in illustrative clarity. As shown in FIG. 3, the blue frequency response 404B is indicated with a solid line, whereas the red frequency response 404R and the green frequency response 404G are indicated with dotted lines. The light incoming to the pixel element of the SLM, as has already been affected by the optical filter 106, includes all of the frequency responses 404R, 404G, and 404B. However, the light output from the pixel element of the SLM has the single frequency response 404B, such that the response 404B is indicated with a solid line, and the responses 404G and 404R are indicated with dotted lines. That is, the pixel element of the SLM has selected the color blue to output, such that the red and the green light are not output. In a given frame period, the pixel element of the SLM may alternatively select red, green, or blue light, or no light at all, such that red or green light is output, instead of the blue light as depicted in FIG. 3, or such that no light at all is output.

Figure 4:
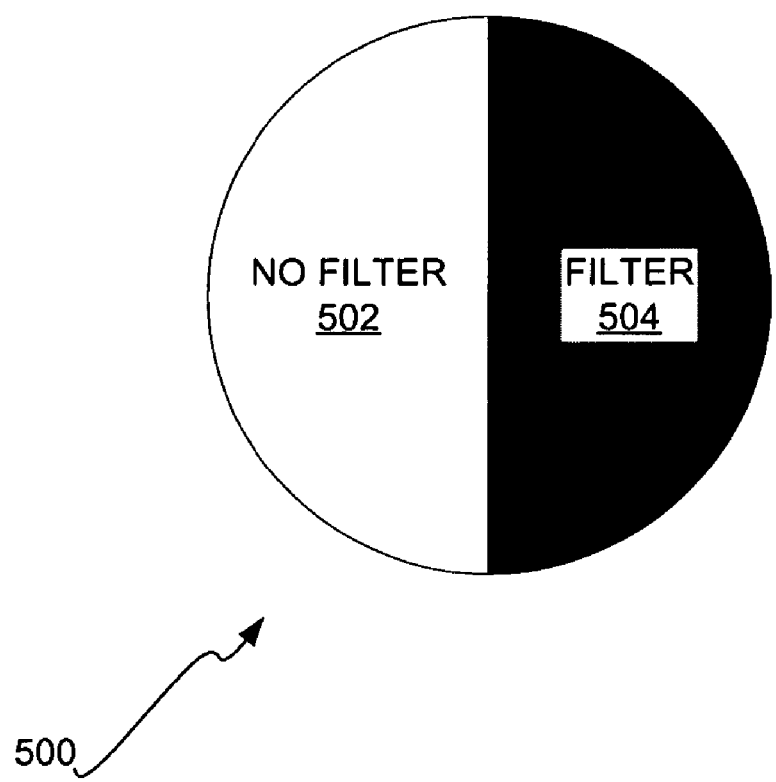
FIG. 4 is a diagram of a rotatable filter wheel in which one part thereof includes filtering functionality, according to an embodiment of the invention.

FIG. 4 shows a rotatable filter wheel 500, according to an embodiment of the invention. The rotatable filter wheel 500 includes a part 502 that is transparent and that does not contain any optical filter, and thus does not provide filtering functionality. The rotatable filter wheel 500 also includes another part 504 that is inclusive of the optical filter. 106, and thus provides filtering functionality. The controller 110 of FIG. 1 may, for instance, be able to control or rotate the rotatable filter wheel 500, so that the optical filter 106 can be selectively situated within the optical path from the light sources 104 of FIG. 1 and the SLM's 124 of FIG. 1 based on a user-set parameter or based on ambient light conditions. That is, the rotatable filter wheel 500 may be rotated so that the light 105 of FIG. 1 is incident to either the part 502, such that the optical filter 106 is not situated within the optical path between the light sources 104 and the SLM's 124, or the part 504, such that the optical filter 106 is situated within the optical path.

In another embodiment, the rotatable filter wheel 500 is rotated such that it makes one complete revolution for each frame of the image data 116 of FIG. 1 input into the controller 110 of FIG. 1 for controlling of the SLM's 124 of FIG. 1 in accordance therewith. When the part 502 is incident to the light 105, the controller 110 modulates the SLM's 124 in accordance with the image data 116 based on, for instance, the cyan and yellow light being present in the light 105. When the part 504 is incident to the light 105, the controller 110 modulates the SLM's 124 in accordance with the image data 116 based on, for instance, the cyan and yellow light being absent from the light 105.

Furthermore, in another embodiment of the invention, the part 502 may provide optical-filtering functionality that is different than the optical-filtering functionality of the part 504. The part 502 may have optical-filtering functionality that removes red, green, and blue colors, so that the primary set of colors of yellow and cyan have spectral peaks that are better defined and accentuated. By comparison, in this embodiment the part 504 may have optical-filtering functionality that removes yellow and cyan colors, so that another primary set of colors of red, green, and blue have spectral peaks that are better defined and accentuated. This, depending on which part 502 and 504 of the wheel 500 through which the light 105 is currently being transmitted, the SLM's 124 modulate the light to provide sequences of yellow, cyan, and no light (i.e., black), or sequences of red, green, blue, and no light (i.e., black).

Figure 5:
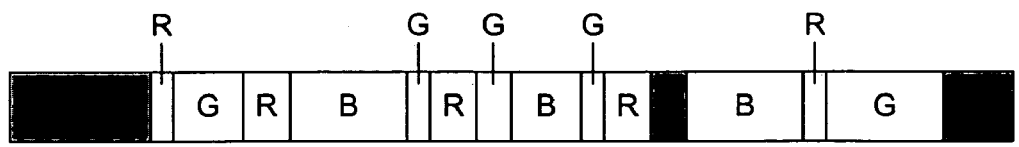
FIG. 5 is a diagram of an example frame period depicting what colors of light are to be used when an optical filter is employed, according to an embodiment of the invention.
Figure 5:
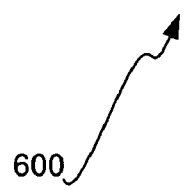
Figure 6:
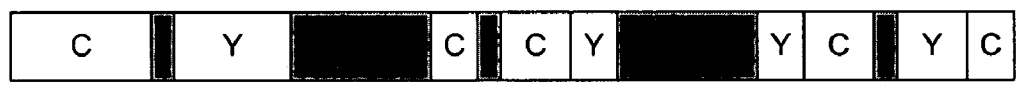
FIG. 6 is a diagram of an example frame period depicting what colors of light are to be used when an optical filter is not employed, according to an embodiment of the invention.
Figure 6:
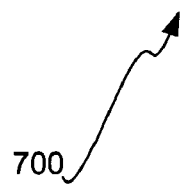

FIG. 5 shows an example frame period 600 for the color of the light 105 of FIG. 1 that may be used when the optical filter 106 of FIG. 1 is employed, such that the filter 106 removes cyan and yellow light and the set of primary colors includes red, green, and blue, according to an embodiment of the invention. That is, FIG. 6 shows the output of primary colors over time for the projection system 100 of FIG. 1 during the frame period 600. The color output may be for a single pixel corresponding to one of the SLM's 124, as enhanced by the filter 106. To generate a color perceptible by a user during the frame period 600, a series of primary colors, such as red, green, and blue, are displayed in succession, along with periods of black, corresponding to no light being displayed.

The frame period 600 is thus divided into different sub-frame sections labeled R, G, and B, corresponding to the primary color of light, such as red, green, and blue, generated during those sections for a given pixel, as well as sections that are shaded, corresponding to when no light is output. These sub-frame sections may also be referred to as time slices. The length of each section is proportional to the length of time that its color of light, or no light in the case of shaded sections, is generated, relative to the frame period 600 itself. The frame period 600 yields improved color accuracy, due to the use of the optical filter 106 causing the color peaks of the light 105 being more defined. That is, the optical filter 106 removes yellow and cyan light, better defining the spectral peaks for red, green, and blue light.

FIG. 6 shows an example frame period 700 for the color of the light 105 of FIG. 1 that may be used when the optical filter 166 of FIG. 1 is not employed, or when the optical filter 106 of FIG. 1 is employed but red, green, and blue light is removed and the set of primary colors includes cyan and yellow, light according to an embodiment of the invention. As with the frame period 600 of FIG. 5, the frame period 700 corresponds to the period of time during which one of the frames of the image data 116 of FIG. 1 is displayed by the projection system 100 of FIG. 1. The color output may be for a single pixel corresponding to one of the SLM's 124 to generate a color perceptible by a user during the frame period 700, a series of primary colors, such as cyan and yellow, are displayed in succession, along with periods of black, corresponding to no light being displayed.

The frame period 700 is thus divided into different sections labeled C and Y, corresponding to the primary color of light, such as cyan and yellow, generated during those sections for a given pixel, as well as sections that are shaded, corresponding to when no light is output. These sub-frame sections may also be referred to as time slices. The length of each section is proportional to the length of time that its color of light, or no light in the case of shaded sections, is generated, relative to the frame period 700 itself. Thus, the example frame period 700 compared to the example frame period 600 of FIG. 5 shows how cyan and yellow light can be used as opposed to red, green, and blue light. Because the cyan and yellow light is brighter in the embodiment where the optical filter 106 is not used, there are more shaded sections in the period 700 than in the period 600. That is, the cyan and yellow light is more efficient than the red, green, and blue light, so the light 105 does not have to be projected for as much time during the frame period 700 as it does during the frame period 600.

Figure 7:
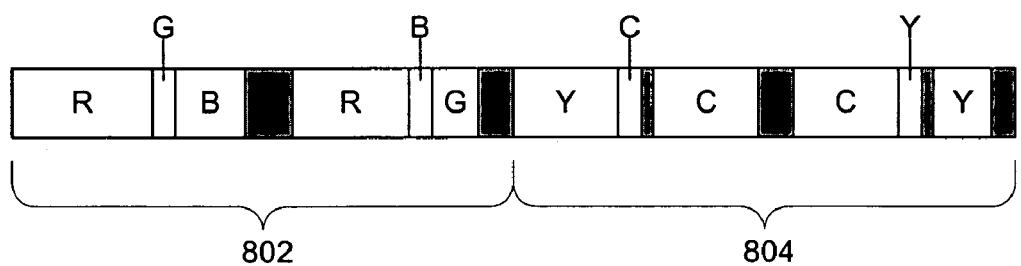
FIG. 7 is a diagram of an example frame period depicting what colors of light are to be used when an optical filter is employed for one sub-frame period of the frame period but not for another sub-frame period of the period, according to an embodiment of the invention.
Figure 7:
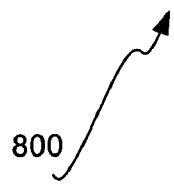

FIG. 7 shows an example frame period 800 for the color of the light 105 of FIG. 1 that may be used when the optical filter 106 of FIG. 1 is part of the rotatable filter wheel 500, according to an embodiment of the invention. As with the frame periods 600 of FIG. 5 and 700 of FIG. 6, the frame period 800 corresponds to the period of time during which one of the frames of the image data 116 of FIG. 1 is displayed by the projection system 100 of FIG. 1, for a single pixel corresponding to one of the SLM's 124. The frame period 800 is divided into a first sub-frame period 802 and a second sub-frame period 804. During the first sub-frame period 802 of the period 800, the part 504 of the wheel 500 that includes the optical filter 106 is in use, whereas during the second sub-frame period 804 of the period 800, the period 502 of the wheel 500 that does not including optical-filtering functionality is in use.

Thus, the first sub-frame period 802 of the period 800 is divided into different sections labeled R, G, and B, corresponding to the color of light, such as red, green, and blue, generated during those sections, as well as sections that are shaded, corresponding to no light being generated. The second sub-frame period 802 of the period 800 is divided into different sections labeled C and Y, corresponding to the color of light, such as cyan and yellow, generated during the sections, as well as sections that are shaded, corresponding to when no light is generated. As before, the length of each section is proportional to the length of time that is color of light, or no light in the case of shaded sections, is generated, relative to the frame period 800 itself.

The utilization of the rotatable filter wheel 500 of FIG. 4 in relation to frame periods such as the frame period 800 of FIG. 7 enables a sub-frame during which the color gamut is enhanced at the expense of some brightness and a sub-frame during which the brightness is enhanced at the expense of defining color primaries. During the first sub-frame period 802, an enhanced color gamut of the light 105 is achieved by using the optical filter of the part 504 of the wheel 500. During the second sub-frame period 804, increased intensity or brightness of the light 105 is achieved by using the part 502 of the wheel 500 that does not have optical-filtering functionality. Thus, the optical filter 106 is removed from the optical path between the light sources 104 of FIG. 1 and the SLM's 124 of FIG. 1 during the second sub-frame period, and is situated within the optical path during the first sub-frame period.

Figure 8:
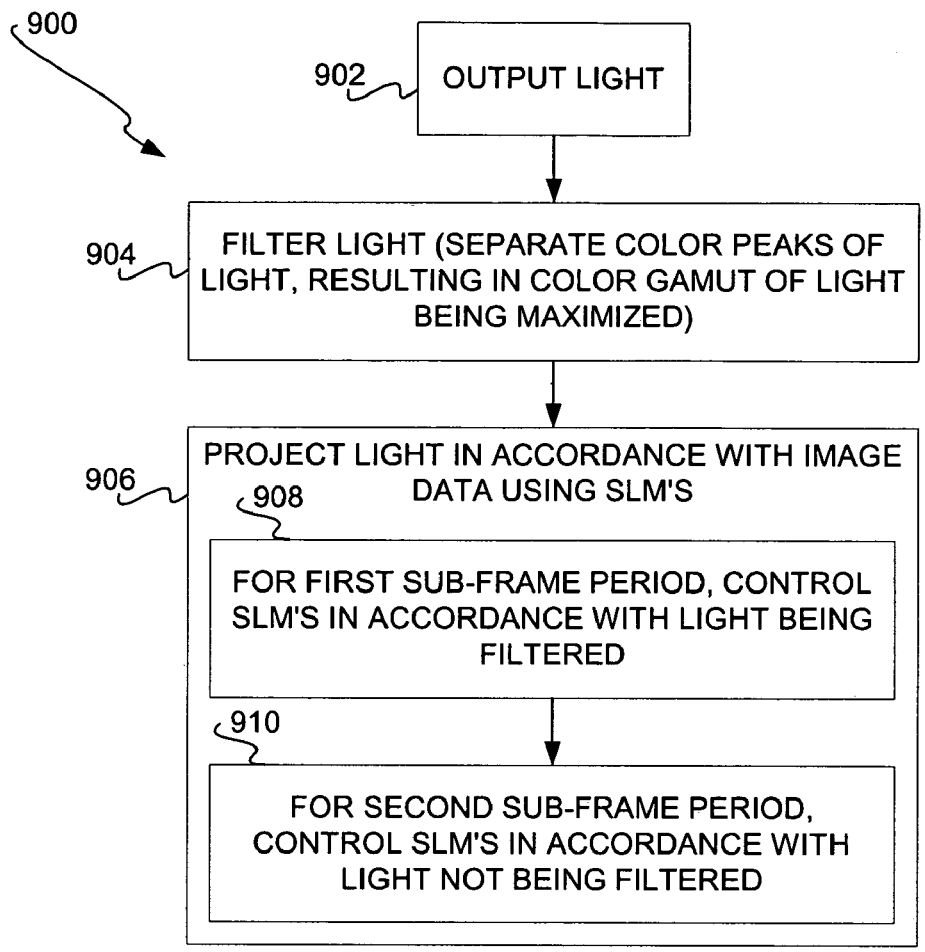
FIG. 8 is a flowchart of a method of using an optical filter within a projection system, according to an embodiment of the invention.

FIG. 8 shows a method 900 for using a projection system having an optical filter, according to an embodiment of the invention. The method 900 may be used, for instance, in conjunction with the projection system 100 of FIG. 1. First, a light beam is output or provided by one or more light sources of the projection system (902). The light beam has a spectral distribution spanning a set of primary colors. This light is then filtered by an optical filter of the projection system (904). Optical filtering of the light removes spectral components that reduce the ability of projector system 100 to generate certain well defined primary colors. Thus, optical filtering the light can expand the color gamut or color space coverage that can be provided by projection system 100. Optical filtering of the light can include removing yellow and/or cyan spectral components from the light. Furthermore, the optical filtering in 902 may be selective optical filtering, as has been described, based on a user-set parameter and/or ambient light conditions. Selective optical filtering may also be accomplished by optical filtering the light for a first sub-frame period of each frame period, and not optical filtering the light for a second sub-frame period of each frame period.

The light, as has been output and optical filtered, is finally projected in accordance with image data, using one or more SLM's (906). Where optical filtering is selective over each frame period, such projection of light may be accomplished as follows. For the first sub-frame period of each frame period, the SLM's are controlled in accordance with the light being optical filtered (908). For the second sub-frame period of each frame period, the SLM's are similarly controlled in accordance with the light not being optical filtered (910). As has been described, such division of each frame period into two sub-frame periods provides for a good compromise between brightness, when the optical filter is not being used, and maximum color saturation and accuracy, when the optical filter is being used.

Figure 9:
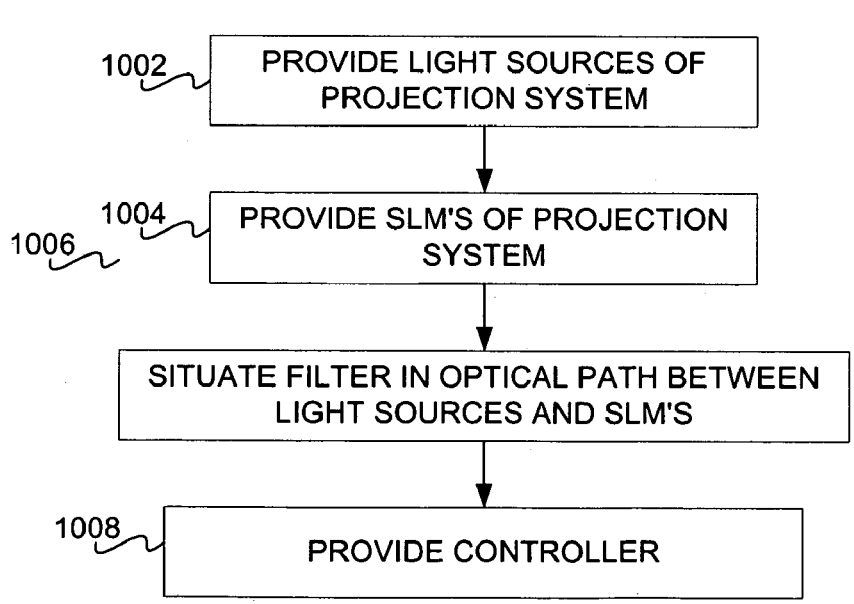
FIG. 9 is a flowchart of a rudimentary method for manufacturing a projection system having an optical filter, according to an embodiment of the invention.

FIG. 9 shows a rudimentary method 1000 for manufacturing a projection system having an optical filter, according to an embodiment of the invention. The method 100 may be used, for instance, for manufacture of the projection system 100 of FIG. 1. One or more light sources of the projection system are provided (1002), as are a number of SLM's of the projection system (1004). An optical filter is situated or selectively situated in the optical path between the light sources and the SLM's (1006). A controller may further be provided to control selective situation of the optical filter in this optical path (1008). The controller also controls the SLM's in accordance with image data and in accordance with whether the light from the light sources is being filtered or not.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A projection system comprising:
a light source configured to generate a light beam having a spectral distribution spanning a set of primary colors;
a spatial light modulator having an array of pixel elements, each pixel element configured to receive a portion of the light beam, the portion of the light beam having the spectral distribution spanning the set of primary colors, and to output a modulated light beam with a spectral peak defining one of the set of primary colors and with no spectral peaks defining any other of the set of primary colors; and,
an optical filter configured to narrow the spectral peak defining the one of the set of primary colors, such that the spectral peak defining the one of the set of primary colors before and after narrowing is centrally located within the spectral distribution.

2. The projection system of claim 1, wherein the optical filter is to narrow the spectral peak such that slopes of the spectral peak become steeper.

3. The projection system of claim 1, wherein the optical filter comprises at least one of: a multiple notch filter, a comb filter, and a multiple narrow band-pass filter.

4. The projection system of claim 1, wherein the optical filter is configured to remove at least one of yellow and cyan from the light spectrum.

5. The projection system of claim 1, wherein the optical filter is configured to remove at least one of red, green, and blue from the light spectrum.

6. The projection system of claim 1, further comprising a mechanism to selectively activate the optical filter.

7. The projection system of claim 6, wherein the mechanism is to selectively activate the optical filter in accordance with a user-set parameter, the user-set parameter controllable via a user interface.

8. The projection system of claim 6, further comprising an ambient light sensor, the mechanism to selectively activate the optical filter based on ambient light conditions detected by the ambient light sensor.

9. The projection system of claim 6, wherein the mechanism comprises a rotatable filter wheel divided into a first part including the optical filter to narrow the profiles of the color peaks for a first set of primary colors and a second part including a second optical filter to narrow the profiles of the color peaks for a second set of primary colors.

10. The projection system of claim 1, further comprising a rotatable filter wheel including a portion that includes the optical filter.

11. The projection system of claim 1, wherein for each of a plurality of frames of the image data, the optical filter is activated for a first sub-frame of the frame and the optical filter is deactivated for a second sub-frame of the frame.

12. The projection system of claim 11, wherein during the first sub-frame the optical filter causes an increased color gamut output for the projection system and during the second sub-frame optical filter being deactivated results in an increased brightness of the projection system.

13. The projection system of claim 11, further comprising a second optical filter, the optical filter to narrow the color peaks for a first set of primary colors and the second optical filter to narrow the color peaks for a second set of primary colors, wherein for each of the plurality of frames of the image data, the second optical filter is deactivated for the first sub-frame of the frame and the second optical filter is activated for the second sub-frame of the frame.

14. The projection system of claim 1, wherein the spatial light modulator is selected from a group essentially consisting of: an interference-based light modulator, a reflective light modulator, and a liquid crystal-based light modulator.

15. A projection system comprising:
a light source generating a beam having a spectral distribution spanning a range of primary colors;
modulating means for receiving the beam having the spectral distribution spanning the set of primary colors and outputting a modulated light beam having a spectral peak defining one of the primary colors and not having spectral peaks defining any other of the set of primary colors; and,
means for narrowing the spectral peak defining the one of the set of primary colors, such that the spectral peak defining the one of the set of primary colors before and after narrowing is centrally located within the spectral distribution.

16. The projection system of claim 15, further comprising means for selectively activating the means for narrowing.

17. The projection system of claim 15, wherein the means for selectively activating the means for narrowing the light selectively activates the means for narrowing based on one of: a user-set parameter and ambient light conditions.

18. The projection system of claim 15, wherein the means for selectively activating the means for narrowing activates the means for narrowing for a first sub-frame of each of a plurality of frames of the image data and deactivates the means for narrowing for a second sub-frame of each of the plurality of frames of the image data.

19. A method comprising:

outputting a light beam having a spectral distribution spanning a set of primary colors;

modulating a portion of the light beam having the spectral distribution spanning the set of primary colors to generate a secondary beam having a spectral peak defining one of the primary colors and not having spectral peaks defining any other of the set of primary colors; and, filtering one of the light beam and the secondary beam to narrow the spectral peak defining the one of the set of primary colors, such that the spectral peak defining the one of the set of primary colors before and after narrowing is centrally located within the spectral distribution.

20. The method of claim 19, wherein filtering the one of the light beam and the secondary beam comprises filtering at least one of yellow and cyan light from the light beam or the secondary beam.

21. The method of claim 19, wherein filtering the one of the light beam and the secondary beam comprises filtering at least one of red, green, and blue light from the light beam or the secondary beam.

22. The method of claim 19, wherein filtering the light beam or the secondary beam is temporally variable.

23. The method of claim 19, wherein filtering the light beam or the secondary beam occurs selectively based on at least one of a user input and ambient light conditions.

24. The method of claim 19, wherein narrowing the color peaks comprises narrowing the color peaks for a first sub-frame of each of a plurality of frames of the image data and not for a second sub-frame of each of the plurality of frames of the image data.

25. A method comprising:

providing a light source of a projection system, the light source configured to generate a light beam having a spectral distribution spanning a set of primary colors;

providing a spatial light modulator of the projection system, the spatial light modulator capable of selecting a primary color from the set of primary colors such that substantially no other primary colors of the set are selected, the spatial light modulator receiving a portion of the light beam having the spectral distribution spanning the set of primary colors; and, providing an optical filter of the projection system, the optical filter capable of narrowing a spectral distribution of the primary color, such that the spectral distribution of the primary color before and after narrowing is centrally located within the spectral distribution.

26. The method of claim 25, farther comprising providing a mechanism to selectively activate the optical filter.

* * * * *

UNITED STATES PATENT AND TRADEMARK OFFICE
CERTIFICATE OF CORRECTION

| | |
|---|---|
| PATENT NO. | : 7,273,282 B2 |
| APPLICATION NO. | : 10/971257 |
| DATED | : September 25, 2007 |
| INVENTOR(S) | : Jim Przybyla et al. |

It is certified that error appears in the above-identified patent and that said Letters Patent is hereby corrected as shown below:

In column 7, line 39, delete "filter 166" and insert -- filter 106 --, therefor.

In column 7, lines 47-48, delete "SLM's 124 to generate" and insert -- SLM's 124. To generate --, therefor.

In column 12, line 24, in Claim 26, delete "farther" and insert -- further --, therefor.

Signed and Sealed this

Twelfth Day of August, 2008

JON W. DUDAS
*Director of the United States Patent and Trademark Office*